(12) United States Patent
Detrick et al.

(10) Patent No.: US 8,839,694 B2
(45) Date of Patent: Sep. 23, 2014

(54) HYDRAULIC REGENERATING AND LOW-SPEED OPERATING POWER SHIFT TRANSMISSION

(75) Inventors: George W. Detrick, Coffeyville, KS (US); Briton T. Eastman, Coffeyville, KS (US); Craig R. Eike, Coffeyville, KS (US); Richard M. Sparks, Bartlesville, OK (US)

(73) Assignee: Deere & Company, Moline, IL (US)

( * ) Notice: Subject to any disclaimer, the term of this patent is extended or adjusted under 35 U.S.C. 154(b) by 753 days.

(21) Appl. No.: 12/478,933

(22) Filed: Jun. 5, 2009

(65) Prior Publication Data

US 2010/0307881 A1 Dec. 9, 2010

(51) Int. Cl.

| | |
|---|---|
| *F16H 47/02* | (2006.01) |
| *B60K 17/10* | (2006.01) |
| *F16H 61/462* | (2010.01) |
| *B60T 1/10* | (2006.01) |
| *F16H 61/4096* | (2010.01) |
| *B60K 6/12* | (2006.01) |
| *F16H 61/421* | (2010.01) |
| *F16H 3/093* | (2006.01) |
| *F16H 3/08* | (2006.01) |

(52) U.S. Cl.
CPC .............. *B60K 17/10* (2013.01); *F16H 61/462* (2013.01); *Y02T 10/6208* (2013.01); *F16H 3/093* (2013.01); *B60T 1/10* (2013.01); *F16H 61/4096* (2013.01); *B60K 6/12* (2013.01); *F16H 2003/0936* (2013.01); *F16H 61/421* (2013.01); *F16H 2003/0818* (2013.01); *F16H 47/02* (2013.01)
USPC ....................................... 74/730.1

(58) Field of Classification Search
USPC ........ 74/730.1, 731.1, 732.1, 733.1; 180/165, 180/305, 307
See application file for complete search history.

(56) References Cited

U.S. PATENT DOCUMENTS

| | | | | |
|---|---|---|---|---|
| 3,383,952 | A * | 5/1968 | Christenson | 475/24 |
| 4,019,404 | A * | 4/1977 | Schauer | 475/82 |
| 4,121,479 | A * | 10/1978 | Schauer | 475/82 |
| 4,215,545 | A | 8/1980 | Castelli et al. | |
| 5,306,215 | A * | 4/1994 | Mann et al. | 475/83 |
| 5,946,983 | A * | 9/1999 | Brambilla | 74/730.1 |
| 6,553,759 | B2 * | 4/2003 | Matsufuji | 60/442 |
| 7,063,638 | B2 * | 6/2006 | Weeramantry | 475/74 |
| 7,588,510 | B2 * | 9/2009 | Johnson | 475/82 |
| 7,597,172 | B1 * | 10/2009 | Kovach et al. | 180/305 |
| 2007/0158129 | A1 * | 7/2007 | Hasegawa et al. | 180/292 |
| 2009/0036248 | A1 | 2/2009 | Mueller | |
| 2010/0269496 | A1 * | 10/2010 | Mueller et al. | 60/325 |

OTHER PUBLICATIONS

European Search Report, 5 Pages, Nov. 5, 2010.
SIPO First Office Action Notice for related Chinese Patent Application No. 201010165264.4, dated Nov. 27, 2013, with English translation.

* cited by examiner

*Primary Examiner* — Robert A Siconolfi
*Assistant Examiner* — Huan Le
(74) *Attorney, Agent, or Firm* — Quarles & Brady LLP

(57) ABSTRACT

A work vehicle including an engine and a transmission. The transmission is driven by the engine. The transmission includes an input clutch, an output clutch, and a hydraulic pump/motor. The hydraulic pump/motor is operatively connected between the input clutch and the output clutch.

20 Claims, 9 Drawing Sheets

HYDRAULIC REGENERATING AND LOW-SPEED OPERATING POWER SHIFT TRANSMISSION

BACKGROUND OF THE INVENTION

1. Field of the Invention

The present invention relates to a transmission, and, more particularly, to a hydraulic regenerating low-speed operating power shift transmission for use in a work vehicle.

2. Description of the Related Art

Work vehicles, such as wheel loaders, are often equipped with a torque converter and a multi-speed power shift transmission. These types of vehicles often include a shuttling method allowing for a rapid change in direction requiring deacceleration and acceleration in an opposite direction. The shuttling method is utilized to provide effective forward and reverse motion for such vehicles as wheel loaders as they approach a pile of aggregate and as they quickly change direction. The lifting bucket is then used to secure the aggregate and the transmission is shuttled into a reverse direction to leave the pile of aggregate. The shuttle mechanism is then shifted to the forward direction to approach a dumping point, such as a bed of a dump truck. The shuttling causes the transmission direction to be reversed, causing the engine to drive the vehicle to a stop, then in the opposite direction. Vehicle brakes are generally used in the decelerating of the vehicle. For low-speed operation, the engine speed must be kept high to drive the other hydraulic systems. This causes a high slip speed in the torque converter, which consumes engine power and fuel. Although the current method is effective, it is very inefficient when the vehicle is shuttling back and forth during low-speed operation.

What is needed in the art is a transmission that is not only effective but efficient in shuttling operations and during low-speed movement of the work vehicle.

SUMMARY OF THE INVENTION

The present invention provides a work vehicle including an engine and a transmission. The transmission is driven by the engine. The transmission includes an input clutch, an output clutch, and a hydraulic pump/motor. The hydraulic pump/motor is operatively connected between the input clutch and the output clutch.

Another embodiment of the present invention consists of a transmission connected to an engine for use in a work vehicle. The transmission including an input clutch, an output clutch, and a hydraulic pump/motor. The hydraulic pump/motor is operatively connected between the input clutch and the output clutch.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
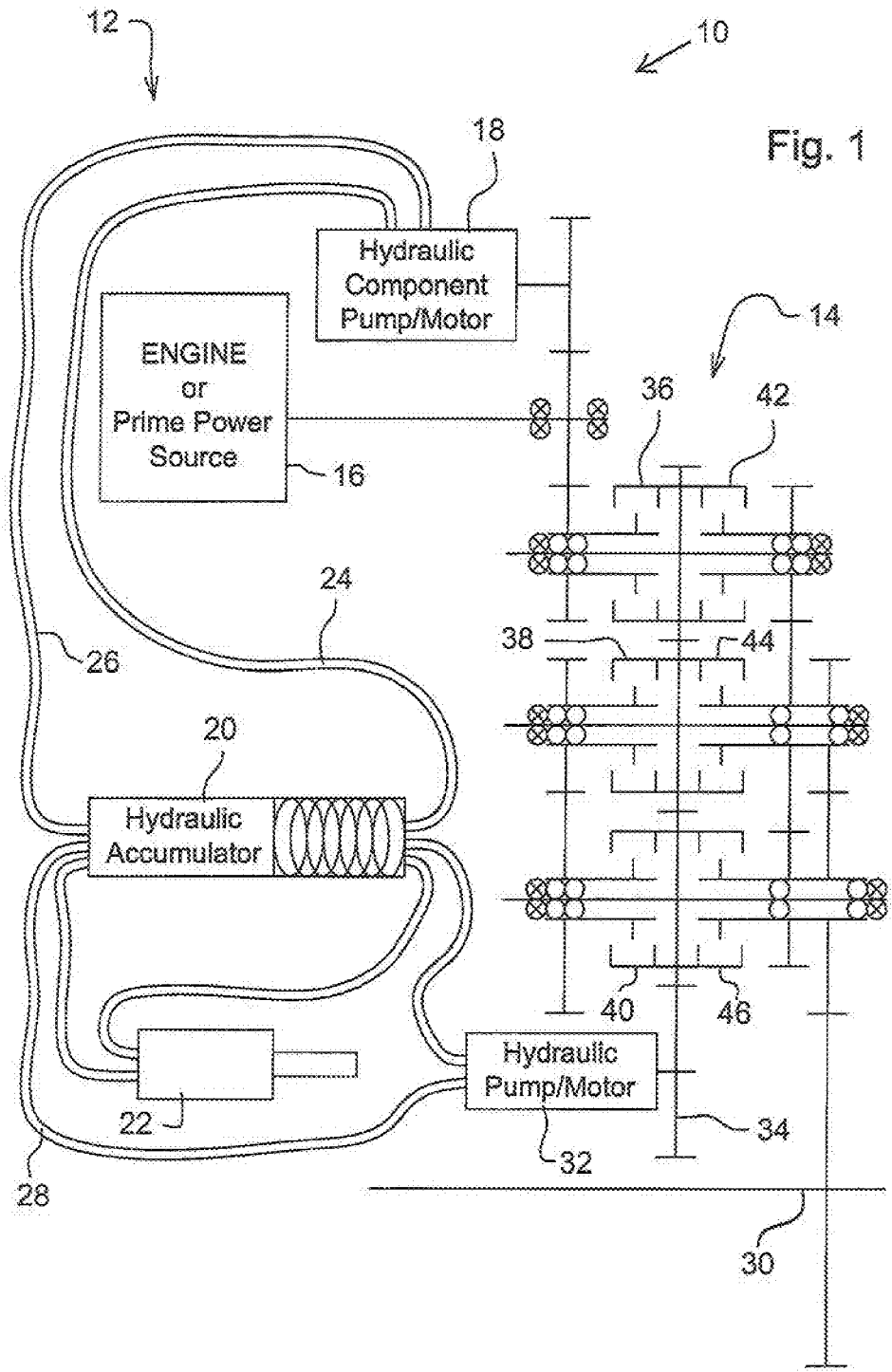
FIG. 1 is a schematical representation of a work vehicle utilizing an embodiment of a transmission system of the present invention.

Referring now to the drawings, and more particularly to FIG. 1, there is illustrated a work vehicle 10 in a schematic form including a power generating/storing and power using system 12, and a transmission system 14. System 12 includes an engine 16, an engine driven hydraulic pump/motor 18, a hydraulic accumulator 20, an actuator 22, and hydraulic lines 24, 26 and 28. Engine 16 may be an internal combustion engine, such as a diesel engine, configured for outputting power to a shaft schematically illustrated as a line emanating from engine 16. Hydraulic pump/motor 18 is directly connected to the power output of engine 16. Hydraulic pump/motor 18 is fluidically connected to hydraulic accumulator 20 by way of hydraulic lines 24 and 26. Hydraulic accumulator 20 accumulates pressurized fluid and dispenses pressurized fluid as required under the control of a control system, not shown. Hydraulic accumulator 20 can provide pressurized fluid to actuator 22 is representative of numerous actuators 22 positioned in work vehicle 10 to accomplish movement of various mechanisms within work vehicle 10. Hydraulic accumulator 20 is additionally connected to transmission 14 by way of hydraulic line 28.

Although not show in the figures, a control system including a controller carries out the coordinated shifting of transmission 14 as well as the control of fluid flows in systems 12 and 14 by way of the use of valves and sensor systems not shown. Additionally, the controller controls the displacement of the pump/motors. The control system may be part of the control system of work vehicle 10 or engine 16 or transmission 14.

Transmission system 14 includes an output shaft 30 that is driven by transmission 14 to provide rotary transmission power to mechanisms of work vehicle 10, such as the wheels. Transmission system 14 also includes a hydraulic pump/motor 32, a power conveying unit 34, input clutches 36, 38, and 40, and output clutches 42, 44, and 46. Power conveying unit 34 may be in the form of a shaft 34 that is selectively connected to output shaft 30 and to engine 16 by use of selective connection of clutches 36, 38, 40, 42, 44, and 46 under control of the controller. The interaction of the clutches which are positioned on each side of the operative connection to hydraulic pump/motor 32 and the adjustment of the displacement of pump/motor 32 in a manner that is coordinated with the engagement of the clutches is an embodiment of the present invention. Hydraulic pump/motor 32 is adjustable in that the stroke can be varied so that the power conveyed by power conveying unit 34 can be minimized or adjusted to a maximum amount to either provide power to power conveying unit 34 or to receive energy therefrom, which is then stored in accumulator 20 and/or used in actuators 22.

No torque converter is included in transmission system 14 and engine 16 is directly connected to transmission 14. The input clutches 36, 38, and 40 selectively connect the engine output of engine 16 to power conveying component 34 and/or an output clutch 42, 44, or 46 as under the control of the control system. Various inputs to the control system may include operator selections of various systems associated with work vehicle 10 including gear speed selection, shuttling selection, and throttle selections.

Figure 2:
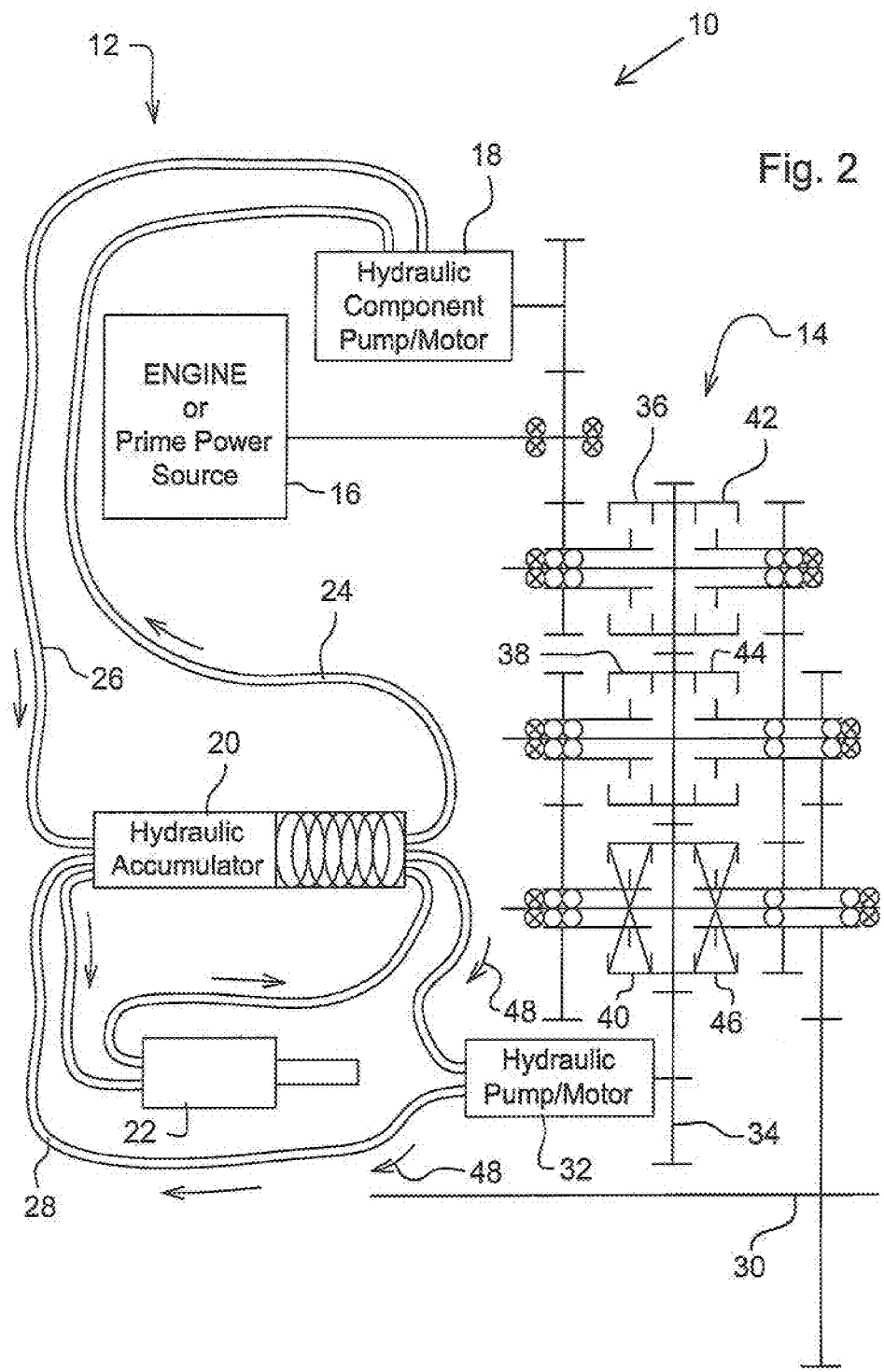
FIG. 2 is the work vehicle of FIG. 1 illustrated in a transport mode.

Now, additionally referring to FIG. 2, there is an illustration of work vehicle 10 being operated in a transport mode with fluid flows 48 illustrated. In transport mode, which can be considered a high-speed mode, engine 16 directly drives the vehicle through all mechanical components, to provide improved efficiency over torque converter driven vehicles. As illustrated in FIG. 2, input clutch 40 and output clutch 46 are engaged so that engine 16 is directly driving output shaft 30, to thereby directly drive work vehicle 10 in a mechanical manner. Hydraulic pump/motor 32 may be destroked if hydraulic pump/motor 18 is providing sufficient hydraulic pressure and fluid flow to drive actuators 22. Hydraulic pump/motor 32 may have its stroke adjusted such that it will provide fluid flow as shown by way of fluid flow 48 to assist pump/motor 18. In this manner, pump/motor 32 of transmission 14 is used to provide energy to actuators 22 and/or accumulator 20.

Figure 3:
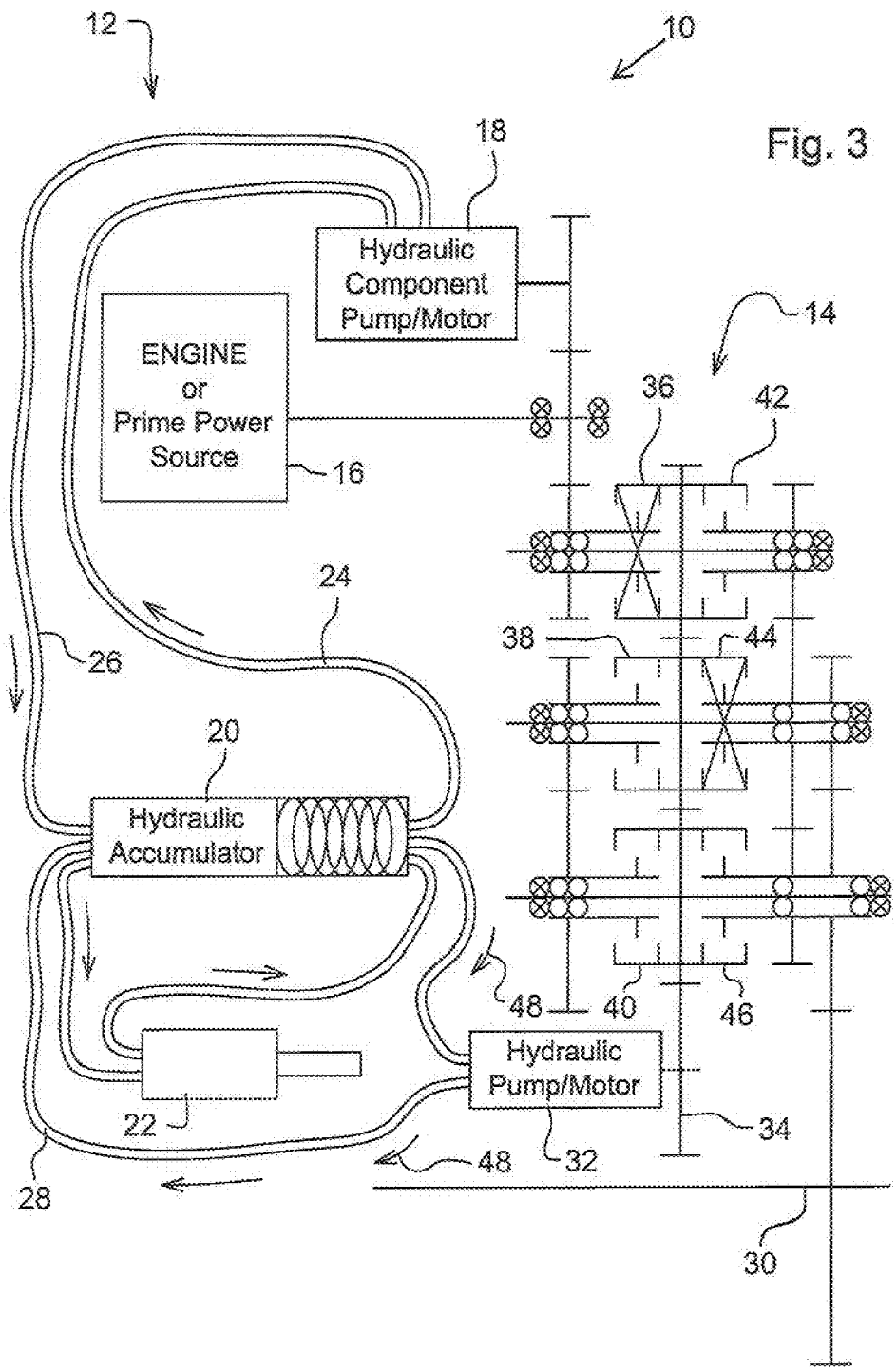
FIG. 3 is the work vehicle of FIGS. 1 and 2 operating in a high-speed deacceleration mode.

Now, additionally referring to FIG. 3, work vehicle 10 is in a high-speed deacceleration mode where vehicle 10 has been operating in a high-speed mode, such as the transport mode of FIG. 2 and is now decelerating having a clutch 36 engaged on the input side and clutch 44 being engaged on the output side, for example. The absorption of energy by the movement of pump/motor 32 as provided by system 14 is done in order to store energy in accumulator 20 rather than waste the energy of deacceleration by utilizing brakes or a system which would result in the production of heat. Clutches 42, 44, and 46 may represent different gear ratios or speed ranges such as low, medium, and high, respectively. In a similar manner input clutches 36, 38, and 40 may have separate gear ratios or even a reversing gear where at least one of clutches 36, 38, and 40 are utilized for reverse operation of work vehicle 10, and may be selectively engaged to provide a shuttling function. In FIG. 3, as work vehicle 10 decelerates, shaft 30 is used to back drive pump/motor 32 so that accumulator 20 can be charged to store energy from the deacceleration. Additionally, the connection of power conveying device 34 by way of the input clutch 36 back drives pump/motor 18 as well. Pump/motor 18 additionally is utilized to charge accumulator 20 and to provide power to actuators 22. Engine 16 can be back driven as well since it is in a deacceleration mode so that if a deacceleration is required beyond the capability of pump/motor 32, and pump/motor 18 the back driving of engine 16 additionally reduces the need for braking and reduces the fuel consumption of engine 16 when engine 16 is using a fuel metering system. The controller selects which device is used to absorb the energy of deacceleration. A priority may be established to utilize pump/motor 32 as the primary power absorbing unit to thereby allow the power output from engine 16 to be disengaged from power conveying unit 34.

In this high-speed deacceleration mode, with the throttle off and the clutch is engaged, engine 16 provides braking and is used in contrast to a typical torque converter-driven vehicle which uses brakes, engine braking, or even reversing the transmission to decelerate. The combination of methods described relative to the present invention provides significant energy efficiency improvements reducing wear on the engine, clutches, and brakes.

Figure 4:
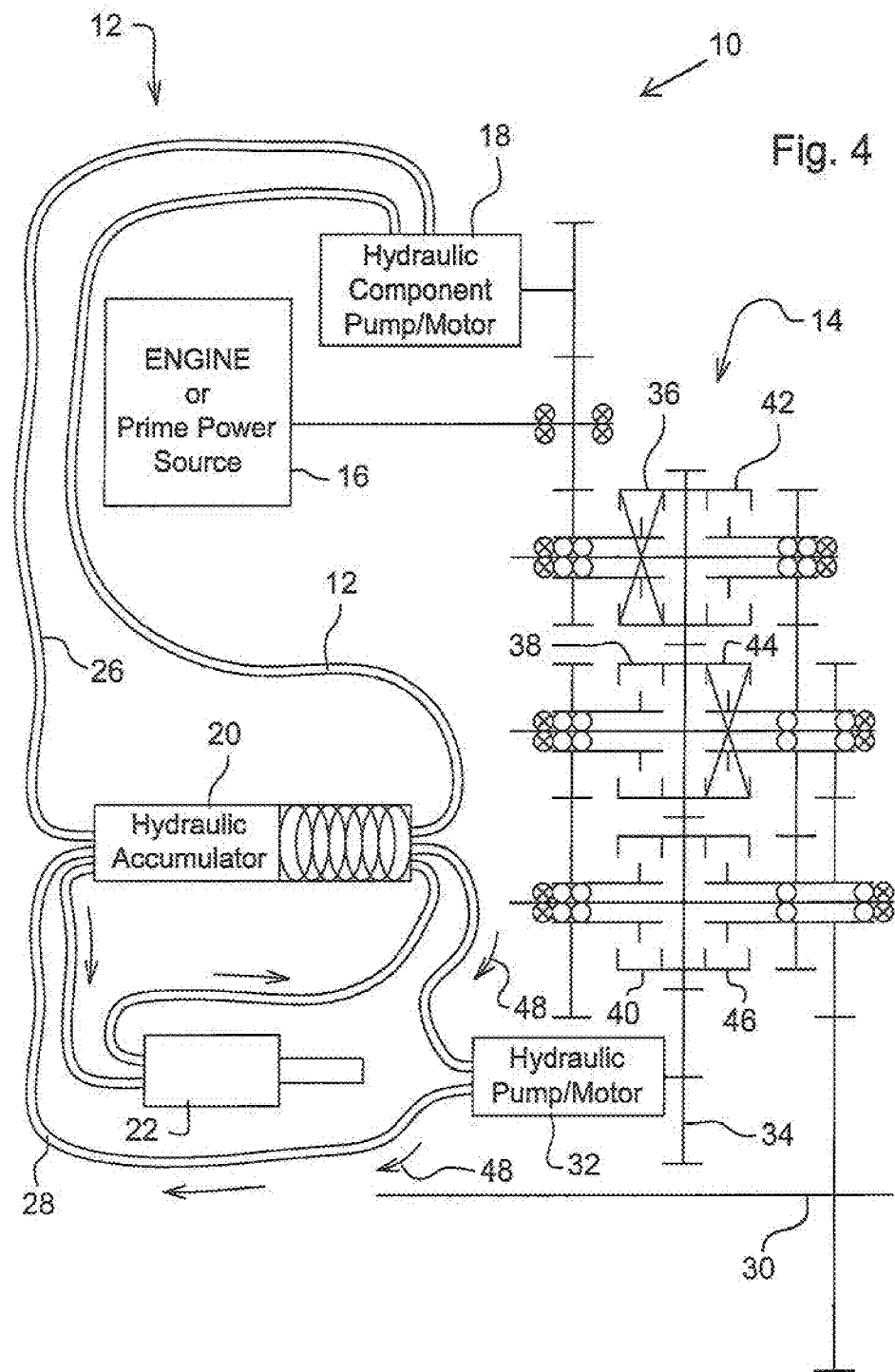
FIG. 4 is the work vehicle of FIGS. 1-3 operating in a low-speed deacceleration mode.

Now, additionally referring to FIG. 4, there is shown a vehicle 10 in a low-speed deacceleration mode. Although input clutch 36 is illustrated as being engaged, it may also be decoupled or disengaged so that hydraulic pump/motor 32 absorbs the entire deacceleration by way of the engagement of output clutch 44. Additionally, selective engagement of clutches 42, 44, and 46 are utilized to adjust the power on power conveying component 34 in its driving of pump/motor 32. Also, the stroking adjustment of pump/motor 32 can be utilized to change the amount of fluid flowing therethrough to thereby further decelerate work vehicle 10 at a controlled rate. The decoupling of the power output of engine 16 from transmission 14 allows engine 16 to operate other vehicle implements, which then can allow the adjustment of the engine speed of engine 16 to match the load being required as engine 16 without regard to transmission system 14. This mode provides improvements over the applying of vehicle brakes, which is common in torque converter-driven vehicles.

Figure 5:
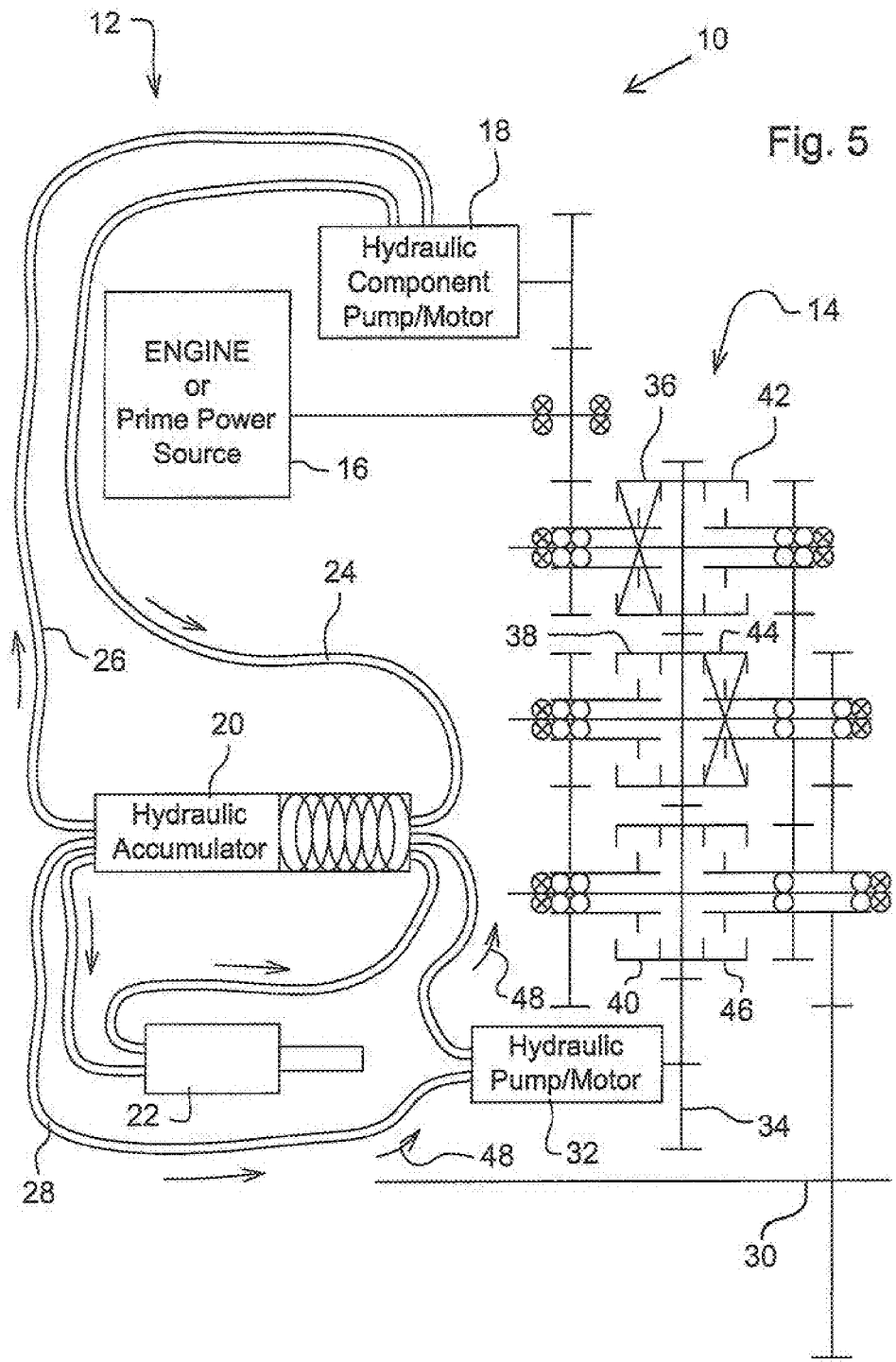
FIG. 5 is the work vehicle of FIGS. 1-4 operating in a high-speed acceleration mode.

Now, additionally referring to FIG. 5, work vehicle 10 is illustrated in a high speed acceleration mode. Here input clutch 36 is engaged and output clutch 44 is engaged directly linking engine 16 to drive output shaft 30 for the propulsion of vehicle 10. Additionally, pump/motor 32 operates in a motor mode with fluid flow 48 operating to provide additional horsepower to power conveying component 34 that is supplied to output shaft 30 in addition to the torque being provided by engine 16. Alternatively, pump/motor 18 may be utilized to provide hydraulic fluid flow to meet the needs of actuators 22. This allows the use of smaller, more efficient engines to provide the same acceleration response as larger engines that use a torque converter.

Figure 6:
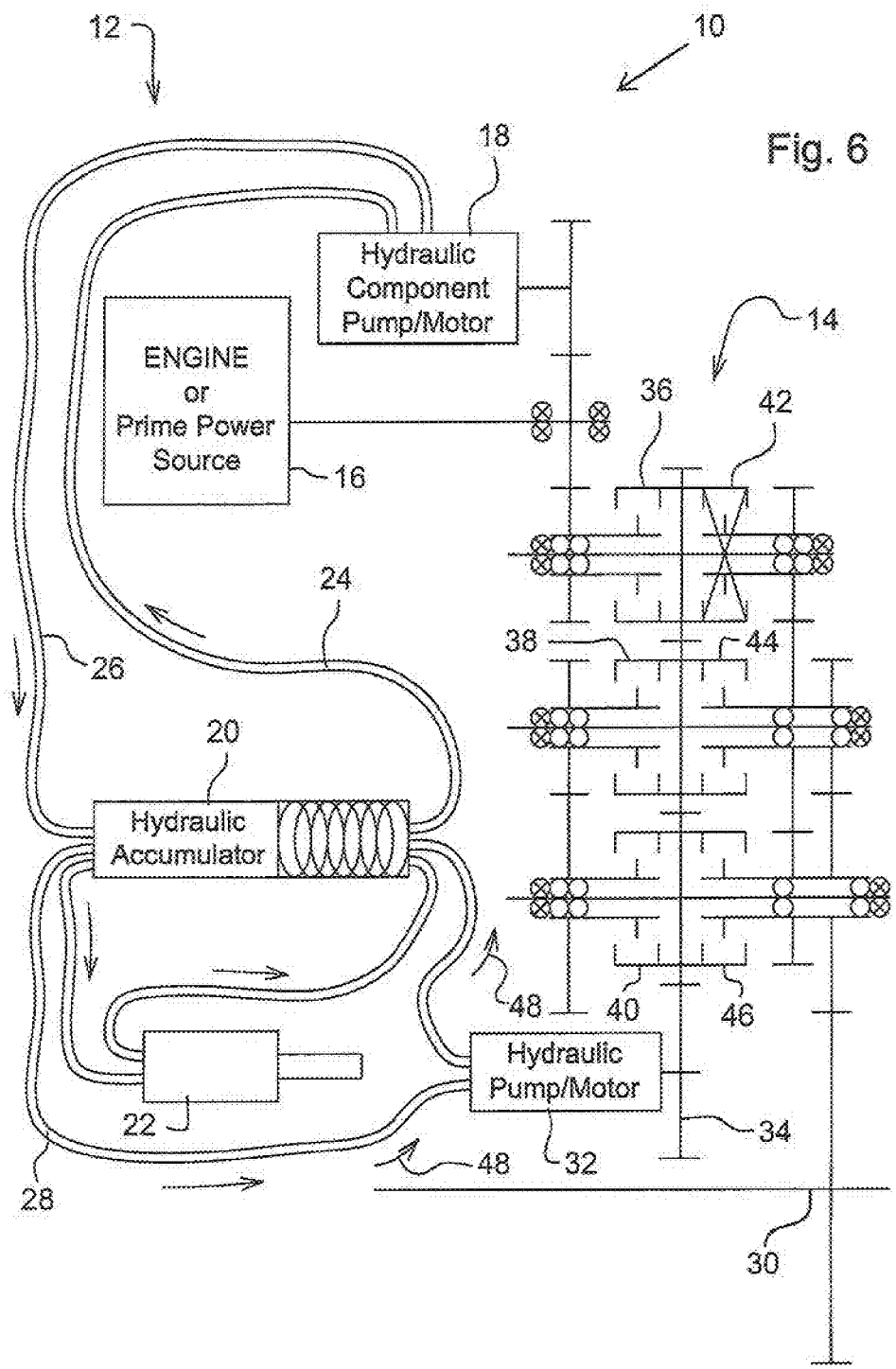
FIG. 6 is the work vehicle of FIGS. 1-5 operating in a low-speed mode.

Now, additionally referring to FIG. 6, work vehicle 10 is in a low speed mode where vehicle 10 is driven by way of pump/motor 32 with clutch 42 here being engaged and input clutches 36, 38, and 40 being disengaged. In this mode, the entire power provided to power conveying component 34 originates with pump/motor 32. Engine 16 is disconnected from the ground by the disengaging of all of the input clutches, and all of the power from engine 16 is available for other uses such as providing power to actuators. Pump/motor 32 is driven by energy stored in accumulator 20 as well as hydraulic fluid flow from pump/motor 18 if the stored energy in accumulator 20 is significantly depleted. This mode of operation provides significant efficiency improvements over torque converter based vehicles, which consume extra fuel driving a nearly stalled torque converter and using braking to control the speed.

Figure 7:
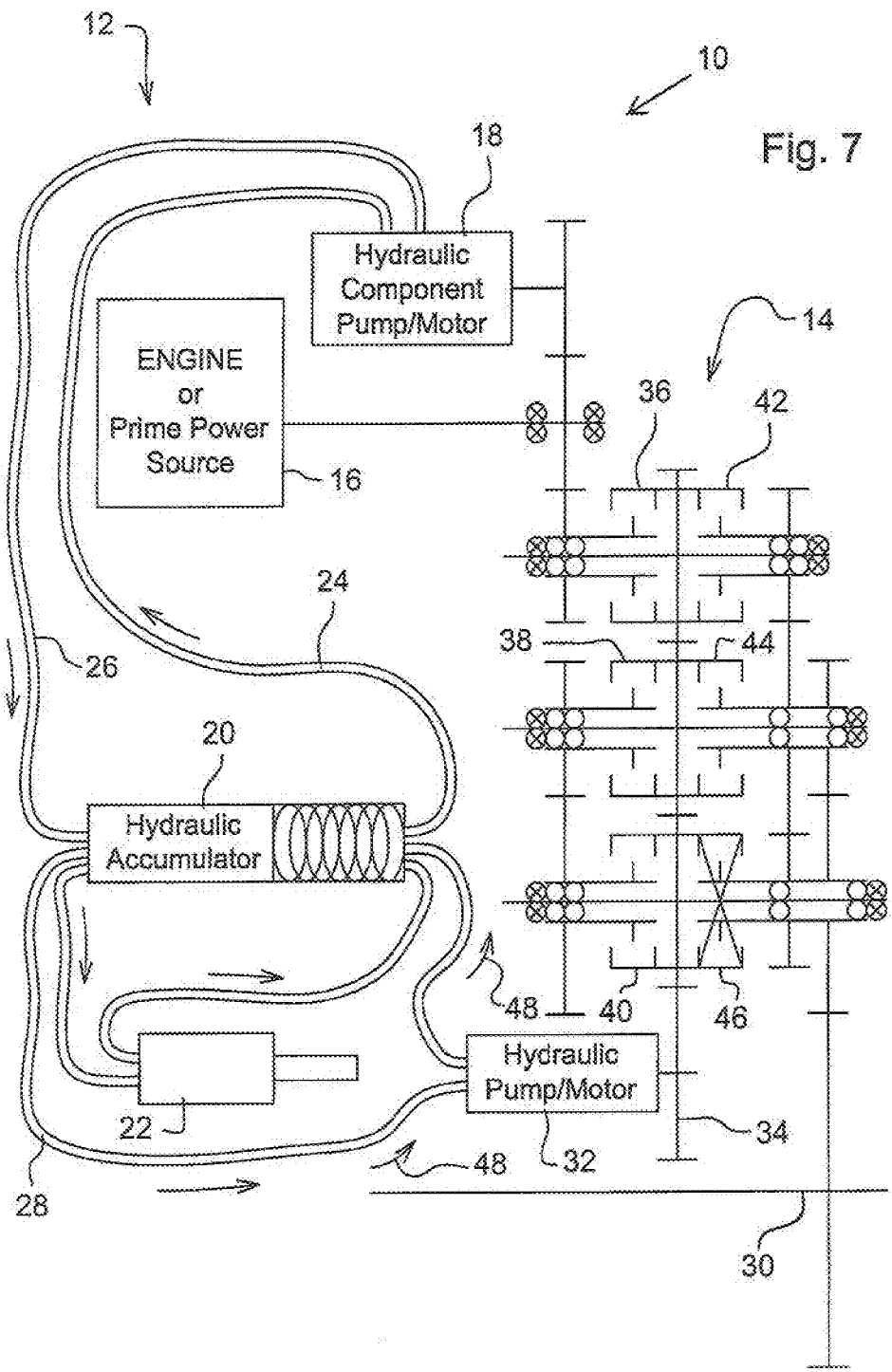
FIG. 7 is the work vehicle of FIGS. 1-6 operating in a low-speed mode undergoing a low-speed transition.

Now, additionally referring to FIG. 7 there is illustrated work vehicle 10 undergoing a low speed transition with only clutch 46 fully engaged. Output clutch 46 can be considered to be a high output clutch that is engaged to provide maximum ground speed from use of pump/motor 32 being the only provision for power thereto. This transition occurs when work machine 10 is slowing down and is in its lowest clutch ranges and is decelerating below its speed range for direct mechanical drive from engine 16, with low range clutch 42 being engaged along with clutch 36. Pump/motor 32 will typically be in one of three conditions. In the first condition, accumulator 20 is utilized to decelerate work machine 10 and engine 16 is engaged to the ground but it is essentially coasting. This transition requires changing output clutch from a low range, output clutch 42, to a high range clutch 46, and dropping the engagement of input clutch 36. As clutch 46 is engaging, pump/motor 32 is increased in displacement to maintain braking torque. The shift scenario is that pressure on clutch 42 is dropped to a point that it may begin to slip and clutch 46 pressure is increased to the slip point, at that point, clutch 42 is disengaged and clutch 36 is disengaged while displacement of pump/motor 32 is increased and pressure on clutch 46 is increased to lock clutch 46 to power conveying shaft 34. The results of these transitional actions results in clutch 46 being engaged as shown in FIG. 7.

In a second condition, such as a heavy load condition, pump/motor 32 is driven by accumulator 20 to help minimize the rate of deceleration of work machine 10. Engine 16 is engaged to the ground and is providing driving motion. The transition then requires a changing of output clutches from low to high as previously discussed from output clutch 42 to output clutch 46 and dropping of input clutch 36. As clutch 46 is being engaged, pump/motor 32 is increased in displacement to maintain an accelerating torque. The sequence of disengaging and engaging clutches is as discussed above.

In the third condition, such as a light load condition, pump/motor 32 is not providing significant torque for accelerating or braking. The engine is engaged to the ground and is driving vehicle 10. The transition requires changing the output clutch from low to high, from output clutch 42 to output clutch 46 and the dropping of input clutch 36. As clutch 46 is engaging and decelerates the clutch shafts, pump/motor 32 increases its displacement to maintain the current rate of deacceleration. The sequence of bringing-clutches to slip points, disengaging clutches, and engaging and locking clutches is as discussed above.

Figure 8:
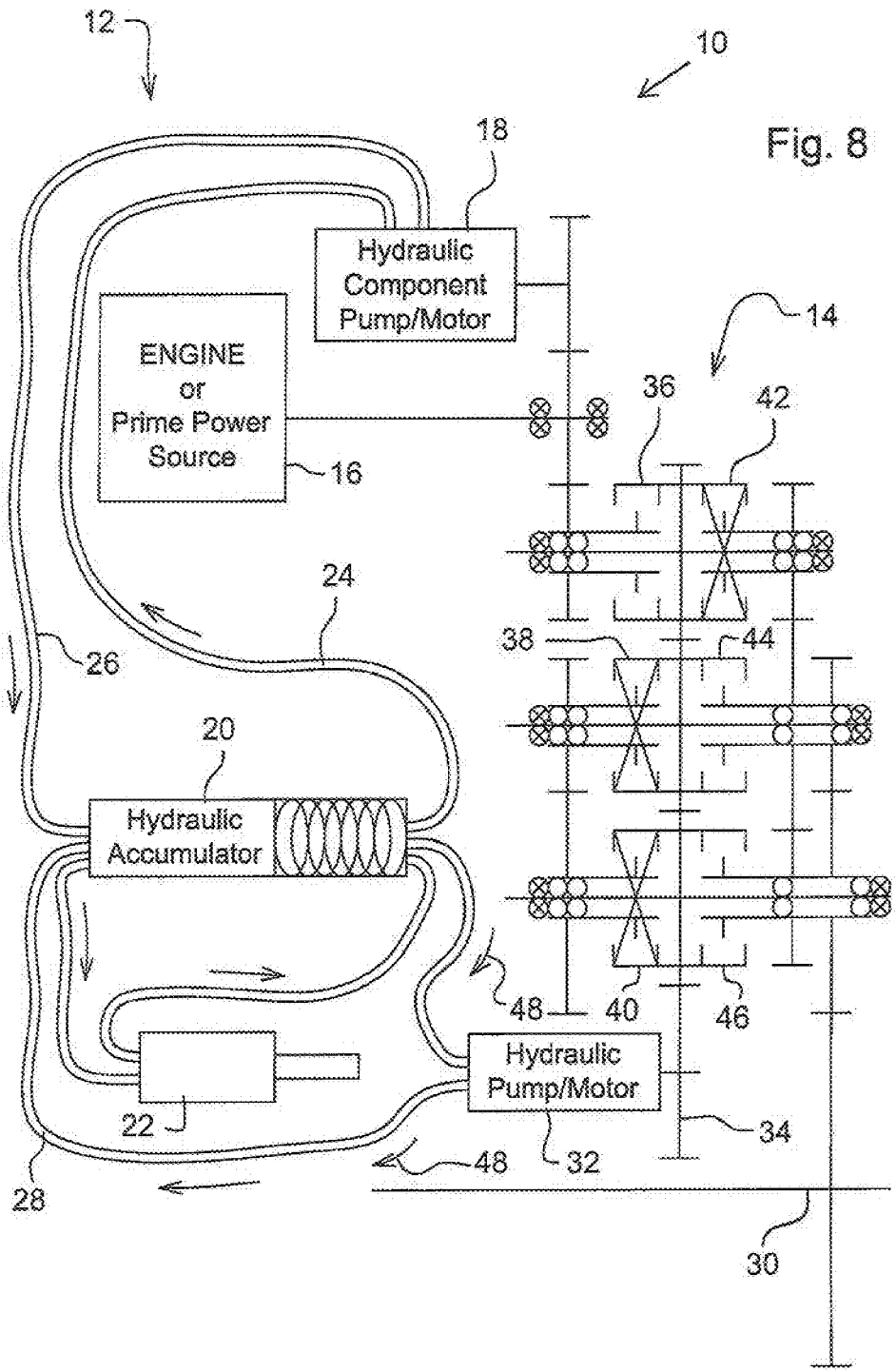
FIG. 8 is the work vehicle of FIGS. 1-7 operating in a transport mode as it undergoes a high-speed transition.

Now, additionally referring to FIG. 8, there is illustrated a transition to high speed transport mode. This transition occurs as it moves from a hydrostatic mode, as illustrated in FIG. 6, to a transport mode as shown in FIG. 2. Work machine 10 is accelerating beyond its speed capability using only the hydraulic driven mode and is transitioning to the engine driven speed range. In this mode, hydraulic pump/motor 32 is driving work machine 10 through clutch 46, the high clutch, and there is no input clutch engaged, so that the engine is disconnected from direct driving of transmission 14. The transition that occurs requires changing the output clutch from the high range to the low range, as such clutch 46 is disengaged and clutch 42 is then engaged and the engaging of a low speed input clutch such as clutch 38 or clutch 40. Although clutches 38 and 40 are illustrated in FIG. 8 as being engaged, only one will be engaged which represent either a low range drive or a reverse drive input clutch. The results of the transition are such that engine 16 will be direct driving work vehicle 10 in the low range mode and hydraulic pump/motor 32 will be destroked. The shift sequence is that pressure on clutch 46 is reduced to near the slipping point; pressure on clutch 38 is increased and begins accelerating gears associated therewith. At the same time, pump/motor 32 is destroked to maintain positive driving torque. The rate of pressure applied to clutch 38 and the removal of pressure from clutch 46 along with a destroking of pump/motor 32 is synchronized by a controller to provide a smooth transition. When clutch 38 proceeds to non-slip point, then clutch 38 is locked. Low speed clutch 42 is engaged and locked and high range clutch 46 is fully decoupled. At this point, work machine 10 is now driving in a transport mode in the lower range, with clutch 38 being engaged. To move to a higher range, clutch 36 is engaged and clutch 38 is decoupled. Work machine 10 can be shifted into and operated in all transmission ranges like any direct drive power shift transmission using the event-based shifting techniques for changing ranges. The displacement of pump/motor 32 can be adjusted to be either a pump, a motor or neither as required by the control system.

Figure 9:
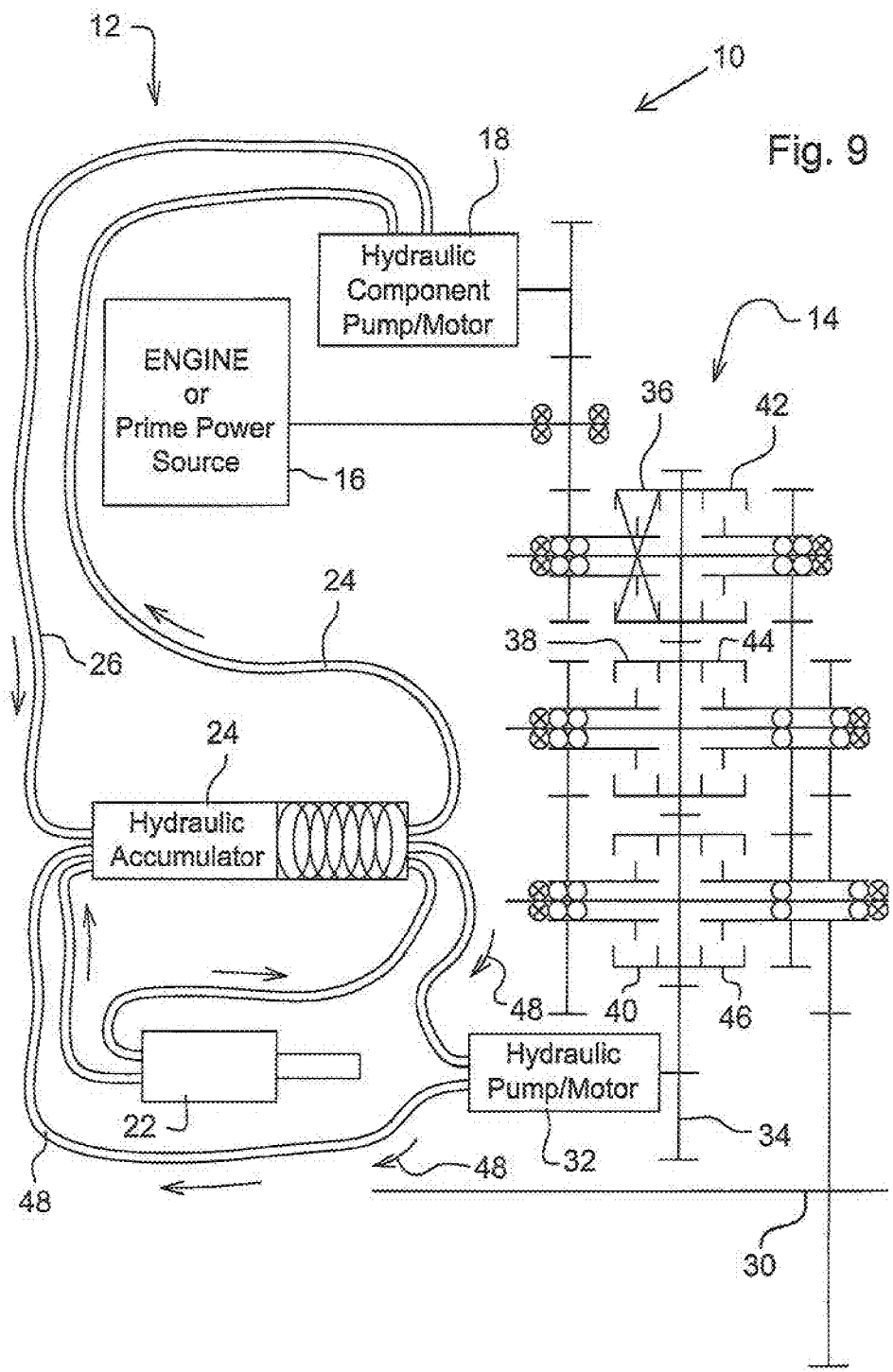
FIG. 9 is the work vehicle of FIGS. 1-8 operating in a hydraulic charging mode.

Now, additionally referring to FIG. 9, there is illustrated a charging mode in which all output clutches 42, 44, and 46 are disengaged and only an input clutch, such as clutch 36, is engaged thereby driving power conveying component 34 to drive pump/motor 32. This is utilized in the event that it is necessary to charge accumulator 20, such as immediately after starting work vehicle 10. Additionally, pump/motor 18 can be utilized to charge accumulator 20 and to provide additional fluid flow and fluid pressure to actuators 22.

Advantageously, the present invention connects a hydraulic pump/motor between the input and output clutches of a transmission. The pump/motor is driven by fluid flow that may come from accumulator 20. The present invention eliminates the use of a torque converter. Under steady-state operation, the direct drive configuration is more efficient than a torque converter. During operation, the hydraulic pump/motor 32 brakes vehicle 10 by charging accumulator 20, and accelerates vehicle 10 by using the stored energy in accumulator 20. The operative connection of pump/motor 32 between the input and output clutches allows engine 16 to be selectively connected or disconnected from the direct mechanical driving of vehicle 10. This allows vehicle 10 to be driven hydrostatically by accumulator 20 during low speed operations, freeing engine 16 to drive other systems as-needed. This provides improved fuel economy over operating a torque converter-driven transmission, at low speeds. By connecting hydraulic pump/motor 32 upstream of output clutches 42, 44, and 46, pump/motor 32 can have its displacement adjusted for optimal operation. The control system advantageously selects how accumulator 20 may be charged dependent upon various inputs such as speed, acceleration, deacceleration, attitude of the work vehicle, operator inputs, and anticipated functions so that accumulator 20 may be properly charged or discharged for efficient operation of work vehicle 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work vehicle, comprising:
an engine;
a transmission driven by said engine, said transmission including:
   a first input clutch operatively connected between said engine and a power conveying unit;
   a first output clutch;
   a first hydraulic pump/motor coupled to said power conveying unit; and
   said power conveying unit operatively connected between said first input clutch and said first output clutch; and,
an accumulator configured to drive said first hydraulic pump/motor;
an actuator connected to said accumulator and configured to be driven by at least one of said first hydraulic pump/motor and said accumulator;
wherein said transmission is configured to transition from a hydrostatically driven mode to a transport mode, said hydrostatically driven mode including said first hydraulic pump/motor driving said first output clutch through said power conveying unit, said transport mode including destroking said first hydraulic pump/motor.

2. The work vehicle of claim 1, wherein the work vehicle is a wheel loader.

3. The work vehicle of claim 1, further comprising a second output clutch, said engine being directly mechanically coupled to said second output clutch during said transition as said first hydraulic pump/motor is being destroked.

4. The work vehicle of claim 3, wherein said transmission is further configured to be shifted such that said engine is decoupled from said second output clutch and is coupled to said first output clutch.

5. The work vehicle of claim 3, wherein said transmission is further configured to synchronize an increasing pressure on said second output clutch with said destroking of said first hydraulic pump/motor.

6. The work vehicle of claim 1, wherein said transmission does not include a torque converter.

7. The work vehicle of claim 6, further comprising a second hydraulic pump/motor drivingly connected to said engine, said second hydraulic pump/motor being at least one of driven by said accumulator and charging said accumulator.

8. The work vehicle of claim 7, further comprising at least one hydraulic component drivingly connected to said accumulator.

9. A transmission connected to an engine for use in a work vehicle, the transmission comprising:
- a first input clutch operatively connected between said engine and a power conveying unit;
- a first output clutch;
- a first hydraulic pump/motor coupled to said power conveying unit; and,
- said power conveying unit operatively connected between said first input clutch and said first output clutch;
- wherein said first hydraulic pump/motor is configured to be driven by an accumulator and wherein an actuator is connected to said accumulator and is configured to be driven by at least one of said first hydraulic pump/motor and said accumulator; and
- wherein the transmission is configured to transition from a hydrostatically driven mode to a transport mode, said hydrostatically driven mode including said first hydraulic pump/motor driving said first output clutch, said transport mode including destroking said first hydraulic pump/motor.

10. The transmission of claim 9, wherein the transmission does not include a torque converter.

11. The transmission of claim 9, wherein the work vehicle is a wheel loader.

12. The transmission of claim 9, further comprising a second output clutch, the engine being directly mechanically coupled to said second output clutch during said transition as said first hydraulic pump/motor is being destroked.

13. The transmission of claim 12, wherein said transmission is further configured to be shifted such that said engine is decoupled from said second output clutch and is coupled to said first output clutch.

14. The transmission of claim 12, wherein said transmission is further configured to synchronize an increasing pressure on said second output clutch with said destroking of said first hydraulic pump/motor.

15. The transmission of claim 12, wherein said transmission is further configured to transition from said transport mode to said hydrostatic mode.

16. The transmission of claim 15, wherein said transition from said transport mode to said hydrostatic mode includes decreasing pressure on said second output clutch and increasing a stroke of said first hydraulic pump/motor.

17. A work vehicle, comprising:
- an engine;
- a transmission driven by said engine, said transmission including:
  - a first input clutch operatively connected between said engine and a power conveying unit;
  - a first output clutch;
  - a second output clutch;
  - a first hydraulic pump/motor coupled to said power conveying unit; and,
  - said power conveying unit operatively connected between said first input clutch and said first and second output clutches; and,
- an accumulator configured to drive or be driven by said first hydraulic pump/motor;
- an actuator connected to said accumulator and configured to be driven by at least one of said first hydraulic pump/motor and said accumulator;
- wherein said transmission is configured to transition from a hydrostatically driven mode to a transport mode;
- said hydrostatically driven mode including said first hydraulic pump/motor driving said first output clutch through said power conveying unit and with said second output clutch disengaged; and
- said transport mode including destroking said first hydraulic pump/motor, said first input clutch engaged, said first output clutch disengaged, and said second output clutch engaged.

18. The work vehicle of claim 17, further comprising a second input clutch and a third input clutch both operatively connected between said engine and said power conveying unit, and a third output clutch operatively connected to said power conveying unit.

19. The work vehicle of claim 17, wherein said transmission is configured to transition from a second transport mode to a second hydrostatically driven mode;
- said second transport mode including said engine driving said first input clutch and said second output clutch with said first output clutch disengaged;
- said second hydrostatically driven mode including stroking said first hydraulic pump/motor, said accumulator driving said first hydraulic pump/motor, said first input clutch disengaged, said second output clutch disengaged, and said first output clutch engaged.

20. The work vehicle of claim 17, wherein said transmission is configured to transition from a second transport mode to a third hydrostatically driven mode;
- said second transport mode including said engine driving said first input clutch and said second output clutch with said first output clutch disengaged;
- said third hydrostatically driven mode including destroking said first hydraulic pump/motor to drive said accumulator, said first input clutch disengaged, said second output clutch disengaged, and said first output clutch engaged.

* * * * *